July 29, 1969    R. HOFFMAN    3,458,031
ORTHODONTIC SPRING CLIP FASTENING SYSTEM
Filed Feb. 8, 1967
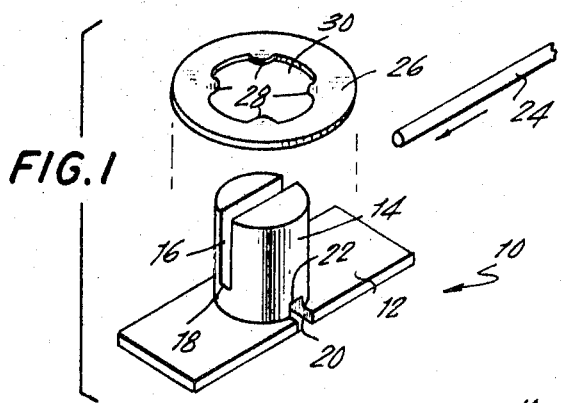
FIG. 1
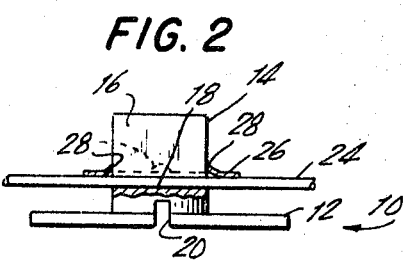
FIG. 2
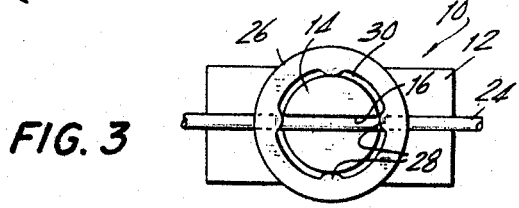
FIG. 3
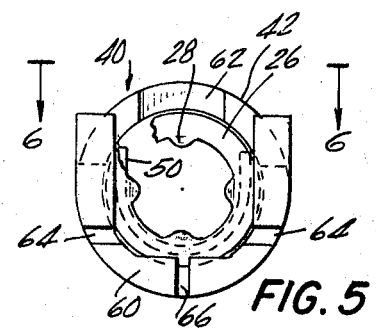
FIG. 5
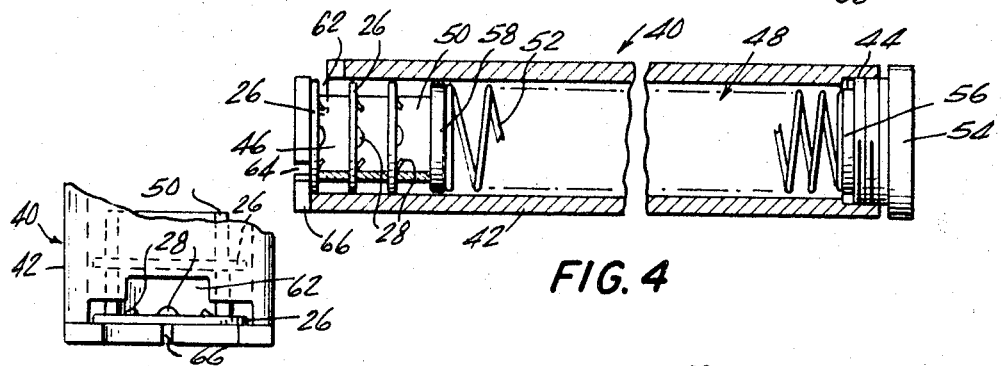
FIG. 4
FIG. 6
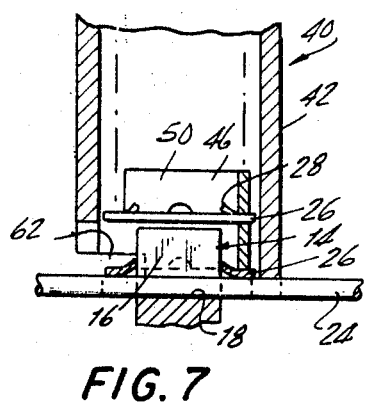
FIG. 7
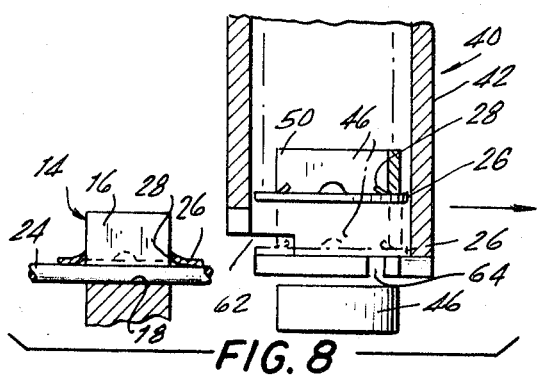
FIG. 8
INVENTOR.
ROBERT HOFFMAN
BY
Kenneth S. Goldfarb
ATTORNEY United States Patent Office 3,458,031
Patented July 29, 1969

3,458,031
ORTHODONTIC SPRING CLIP
FASTENING SYSTEM
Robert Hoffman, 17 Copper Beech Place,
Merrick, N.Y. 11566
Filed Feb. 8, 1967, Ser. No. 614,613
Int. Cl. B65d 83/00
U.S. Cl. 206—56
8 Claims

ABSTRACT OF THE DISCLOSURE

An orthodontic instrument for use with an orthodontic spring clip fastening system including a post and clip type fasteners therefore wherein the instrument comprises a housing having a longitudinal axis and defining a magazine having a plurality of fasteners therein. Spacer means are disposed in the magazine maintaining the fasteners in spaced relationship with the housing having a discharge end for the fasteners provided with an opening therein. The housing has slot means therein adjacent the opening and retaining means are provided on the housing. Spring means are disposed in the housing for urging the fastener adjacent the discharge end against the retaining means. The fasteners are discharged through the slot means in a direction normal to said longitudinal axis and onto a smooth sided post.

---

This invention relates to an orthodontic spring clip fastening system and to an orthodontic instrument for use in conjunction with this system.

In carrying out major orthodontic practices for straightening and improving the disposition of the teeth in the mouth of a patient, it has been the practice to provide for ligature of wires and elastic. This usually results in twisted wire pigtails and other dispositions which proved irritating to the mouth and particularly the lips of the patient. Various types of orthodontic appliances have been developed to attempt to eliminate the wire pigtails, but these have proven unsatisfactory because they have generally required a relatively awkward device for application of clips and other similar fastening devices and have required elaborate arrangements whereby only wires of a certain size could be used. Further, the prior art systems promoted relatively loose fastening of the wires, while also requiring careful installation of clips into predetermined grooves, and further full utility of such systems was precluded by the size of the orthodontic instrument with respect to the mouth of the patient.

It is therefore the primary object of the present invention to provide an orthodontic instrument for use in an orthodontic spring clip fastening system which overcomes the aforesaid disadvantages and which is convenient and effective in use.

The construction of this invention features an orthodontic spring clip fastening system in which a closed ring-shaped fastener is resiliently mounted on a smooth sided cylindrical post for pressing a wire into a groove in the post. An orthodontic instrument having a magazine of clips is provided for successively mounting clips on posts to hold a wire in place. The orthodontic instrument is so arranged as to be relatively small and capable of being utilized in all portions of a patient's mouth for conveniently installing a clip at its desired location. This instrument is generally of a pencil size and shape and is entirely unlikely to endanger the gums or lips of the patient when being used.

Still further objects and features of this invention reside in the provision of an orthodontic spring clip fastening system that is simple in construction, which is capable of being manufactured by mass production methods so as to permit wide use and distribution, and which is capable of being made of and utilizing conventional orthodontic materials.

These, together with the various ancillary objects and features of this invention, which will become apparent as the following description proceeds, are attained by this orthodontic spring clip fastening system, a preferred embodiment of which is shown in a great enlarged scale in the accompanying drawing, by way of example only, wherein:

FIG. 1 is an exploded view of the post, wire, and clip, forming elements of the system;

FIG. 2 is an elevational view with parts shown in section of the post, clip and wire as installed;

FIG. 3 is a top plan view of the arrangement shown in FIG. 2;

FIG. 4 is a longitudinal sectional detail view of an orthodontic instrument utilized in conjunction with the system;

FIG. 5 is an enlarged end elevational view of the orthodontic instrument;

FIG. 6 is a partial plan view looking along the line 6—6 in FIG. 5;

FIG. 7 is a sectional detail view illustrating the manner in which the orthodontic instrument is utilized in conjunction with the post and wire for installing a clip thereon; and, FIG. 8 is an exploded view similar to FIG. 7, but showing the manner in which the spacer means falls free after a clip has been installed on the post.

With continuing reference to the accompanying drawing, wherein like reference numerals designate similar parts throughout the various views, reference numeral 10 is used to generally designate a base plate 12 having a smooth sided cylindrical post 14 integrally formed with the plate 12 and rising therefrom. The post 12 is provided with a relatively deep slot 16 therein which terminates at a bottom 18. A slot 20 opening into the bottom of the plate 12 extends partially into the post 14 and terminates at an upper surface 22 below the bottom 18.

In conjunction with the orthodontic system, a conventional wire 24 formed of suitable material as is conventionally utilized in orthodontic procedures is disposed in the slot 16 and is held in place by a closed ring-shaped clip 26 which has a plurality of detents 28 extending into the central opening 30 thereof. The diameter of a circle tangent to the innermost surfaces of the detents 28 is of a slightly smaller dimension than the outer diameter of the post 14 so that the spring clip 26 when disposed on the post 14 will resiliently engage the post 14 and hold the wire 24 pressed downwardly against the bottom 18 in a secure manner as can be seen in FIG. 2. In order to install the clips 26 in position on the post 14, the orthodontic instrument generally indicated in FIG. 4 by reference numeral 40 is employed.

The orthodontic instrument 40 includes a tubular housing 42 having a longitudinal axis and having a threaded end 44 and a discharge end 46. The housing 42 forms a magazine 48 for a plurality of the clips 26 and a plurality of spacers 50 forming spacing means are alternately disposed between the clips 26 to hold the clips 26 in spaced relationship. A compression spring 52 is disposed in the housing 42 and the amount of compression on the spring may be adjusted by a screw-type adjusting cap 54 which is threadedly engaged on the end 44 and which is provided with a surface 56 for engaging the spring 52. Fixed to the other end of the spring 52 remote from the adjusting cap 54 is a disc 58 which is adapted to engage the innermost spacer 50.

A U-shaped retaining means 60 is fixed to or integral with the tubular housing 42 at the discharge end and the spring 52 urges the outermost clip 26 against the retaining means 60 as can be best seen in FIGS. 4 and 5. The retaining means 60 has its inner dimensions of less than those of the clips 26 but which are greater than those of the U-shaped spacers 42. A slot 62 is formed in the housing 42 through which the clips 26 can pass for discharge from the housing 42. The spacers 50 have their outer dimensions slightly less than the inner dimensions of the retaining means 60 so that they are free to fall through the discharge end 46 and through the opening defined by the inner boundaries of the retaining means 60. The retaining means 60 is provided with slots 64 and slot 66 therein so that the retaining means can bear against the wires being worked on with the wires being receivable in such slots as may be necessary for effective installation of the clips 26 on the posts.

In use, the instrument 40 is applied directly over the post 14 with the post being received in the discharge end 46 and extending upwardly through the opening 30 of the outermost clip 26. Then, sliding the instrument 40 normal to its longitudinal axis of the post 14 will discharge the clip from the instrument 40, leaving it in position with the wire pressed into the groove 16 as can be seen in FIG. 8. Then, the spacer 46 falls free allowing the next clip 26 to be pressed by the spring 52 against the retaining means 60. During the fastening, the groove 66 is used for reception of the wire 24 for aiding in seating it in the slot 16 in the post 14. The grooves 64 are used to provide torque or twisting the wire 24 to place it in the groove 16 as such is found necessary.

A latitude of modification, change and substitution is intended in the foregoing disclosure, and in some instances some features of the invention will be employed without a corresponding use of other features.

I claim:

1. An orthodontic instrument comprising a housing having a longitudinal axis and defining a magazine having a plurality of fasteners therein, spacer means disposed in said magazine maintaining said fasteners in spaced relationship along said longitudinal axis, said housing having a discharge end for said fasteners provided with an opening therein, said housing having slot means therein adjacent said opening, retaining means on said housing at said discharge end, spring means in said housing urging the fastener adjacent said discharge end against said retaining means, said fasteners being discharged through said slot means in a direction normal to said longitudinal axis.

2. An orthodontic instrument according to claim 1, wherein said fasteners are of greater diameter than said spacer means, said spacer means being thicker than said fasteners and being discharged through said opening.

3. An orthodontic instrument according to claim 1, wherein said fasteners are ring shaped, said spacer means including a plurality of U-shaped spacers.

4. An orthodontic instrument according to claim 1, wherein said retaining means is substantially U-shaped.

5. An orthodontic instrument according to claim 1, including means on said housing for adjustably compressing said spring means.

6. An orthodontic instrument according to claim 1, wherein said housing is substantially cylindrical in shape.

7. An orthodontic instrument according to claim 1, wherein said fasteners are of ring shape and are of greater diameter than said spacer means, said spacer means being U-shaped and being thicker than said fasteners and being discharged through said opening, said retaining means being of a U-shape, said housing being substantially cylindrical in shape, and means on said housing for adjustably compressing said spring means.

8. An orthodontic instrument according to claim 1, wherein said retaining means is provided with at least one slot therein for receiving wire means.

References Cited

UNITED STATES PATENTS

| 1,844,285 | 2/1932 | Johnson | 206—56 |
| 2,577,319 | 12/1951 | Feitl | 85—36 |
| 2,698,682 | 1/1955 | Bodan | 206—56 |
| 3,210,818 | 10/1965 | Wallshein | 24—125 |

WILLIAM T. DIXSON, JR., Primary Examiner

U.S. Cl. X.R.

32—14; 312—71